United States Patent
Lopez et al.

(10) Patent No.: US 8,131,463 B2
(45) Date of Patent: Mar. 6, 2012

(54) GNSS NAVIGATION SOLUTION INTEGRITY IN NON-CONTROLLED ENVIRONMENTS

(75) Inventors: Nestor Zarraoa Lopez, Madrid (ES); Juan Ramon Martin Piedelobo, Madrid (ES); Manuel Toledo Lopez, Madrid (ES); Joaquin Cosmen Schortmann, Madrid (ES)

(73) Assignee: GMV Aerospace and Defence, S.A. (ES)

( * ) Notice: Subject to any disclaimer, the term of this patent is extended or adjusted under 35 U.S.C. 154(b) by 425 days.

(21) Appl. No.: 12/393,665

(22) Filed: Feb. 26, 2009

(65) Prior Publication Data

US 2010/0033370 A1 Feb. 11, 2010

Related U.S. Application Data

(63) Continuation-in-part of application No. 11/002,853, filed on Dec. 2, 2004, now abandoned.

(60) Provisional application No. 60/526,314, filed on Dec. 2, 2003.

(51) Int. Cl.
*G01C 21/00* (2006.01)

(52) U.S. Cl. ........................................ 701/213; 701/200

(58) Field of Classification Search .................. 701/200, 701/213
See application file for complete search history.

(56) References Cited

U.S. PATENT DOCUMENTS

| | | | |
|---|---|---|---|
| 5,825,326 A * | 10/1998 | Semler et al. | 342/357.27 |
| 5,831,576 A * | 11/1998 | Sheynblat | 342/357.64 |
| 5,917,445 A | 6/1999 | Schipper et al. | |
| 6,337,657 B1 | 1/2002 | Zhodzishsky et al. | |
| 6,421,000 B1 | 7/2002 | McDowell | |
| 6,691,066 B1 | 2/2004 | Brodie | |
| 6,727,846 B1 | 4/2004 | Brown | |
| 6,771,214 B2 | 8/2004 | Kober et al. | |
| 6,798,377 B1 | 9/2004 | Lupash et al. | |
| 6,850,497 B1 * | 2/2005 | Sigler et al. | 370/310 |
| 7,110,882 B2 | 9/2006 | Moser et al. | |
| 2002/0050944 A1 | 5/2002 | Sheynblat et al. | |
| 2005/0052319 A1 | 3/2005 | Hatch et al. | |
| 2005/0060069 A1 | 3/2005 | Breed et al. | |

OTHER PUBLICATIONS

[RD.1] Minimum Operational Performance Standards for Global Positioning System/Wide Area Augmentation System Airborne Equipment, RTCA/DO-229C, Nov. 28, 2001. [RD.2] Y. C. Lee, K. L Van Kyke, Analysis Performed in Support of the Ad-Hoc Working Group of RTCA SC-159 on RAIM/FDE Issues, in Proc. National Technical Meeting ION, ION NTM Jan. 2002.

(Continued)

*Primary Examiner* — Gerald J O'Connor
*Assistant Examiner* — Neha Patel
(74) *Attorney, Agent, or Firm* — Cantor Colburn LLP

(57) ABSTRACT

Disclosed is a method for providing a Global Navigation Satellite System (GNSS) navigation position solution with guaranteed integrity in non-controlled environments, the method including processing a (GNSS) signal including multiple satellites generating at least one signal to obtain carrier phase and pseudorange measurements; pre-processing the measurements to detect and characterize local errors in the measurements, wherein the local errors cannot be ascertained a priori, the characterization including providing error bounds estimated by measuring the carrier phase and pseudoranges measurements, thereby providing a set of measurements rejections when the characterization is not possible; and using the estimated error bounds, together with error bounds provided by the GNSS signal concerning satellite and ionospheric errors, to build in each measurement an estimated noise level in the measurements as input to a weighted Receiver Autonomous Integrity Monitoring (RAIM) algorithm in order to compute position coordinates and associated protection levels in the non-controlled environments.

4 Claims, 6 Drawing Sheets

OTHER PUBLICATIONS

[RD.3] Weighted RAIM for Precision Approach, T. Walter, P. Enge, ION GPS, 1995.
[RD.4] Navstar GPS Use Equipment Introduction, 1996.
[RD.5] Integrity Measure for Assisted GPS Based on Weighted Dilution of Precision, H. Sairo, J. Syrjarinne, J. Lepakoski and J. Takala, ION GPS 2002, Sep. 2002.
[RD.6] Solution of the Two Failure GPS RAIM Problem Under worst Case Bias Conditions: Parity Space Approach, R. Grover Brown, Navigation, vol. 44, No. 4, Winter 1997-98.
Printout of Google Search on Dec. 18, 2008: site:ieee.org RAIM multiple errors.

* cited by examiner

GNSS NAVIGATION SOLUTION INTEGRITY IN NON-CONTROLLED ENVIRONMENTS

CROSS REFERENCE TO RELATED APPLICATIONS

This application is a continuation-in-parts under 35 U.S.C. §120 of U.S. patent application Ser. No. 11/002,853 filed on Dec. 2, 2004 now abandoned, the entire content of which is herein incorporated by reference in its entirety, wherein said U.S. patent application Ser. No. 11/002,853 is a non-provisional patent application based on Provisional Application No. 60/526,314 filed Dec. 2, 2003.

FIELD OF THE INVENTION

The present invention relates to methods and algorithms for implementing in future Global Navigation Satellite Systems (GNSS) receivers and/or GNSS-based applications in order to ensure the integrity of the provided navigation solution even when the user is in non-controlled environments such as urban areas or roads.

The Method pays special attention to the detection and exclusion of measurements either with large multipath or subject to reflections that invalidates the main assumptions required for the computation of Protection Levels derived from a GNSS system with guaranteed signal integrity (as it is the case of SBAS and Galileo and/or GPS III in the future).

Present invention can be applied in a wide diversity of fields, whenever position/velocity information is used between parties with liability (either legal, administrative or economical) implications. Examples of those so-called liability critical applications are: 1. Position dependant billing systems: Applications for automatic tolling, road pricing, congestion control, zone fees, city parking tolling, etc. The system described guarantees that position derived billing is based upon information which error is bounded. Thus probability to have billing claims due to out of bounds errors is controlled to required level. 2. Position dependant law enforcement systems: Whenever position and velocity information is used as evidence with legal implications the system described guarantees involved parties a error-bounded position evidence. This can be for instance applied for traffic law enforcement as well as surveillance of parolees. 3. Position dependant taxes collection: Whenever position, velocity and time information is used as the basis for taxes collection for instance for road and urban environments where specific taxes policies can be implemented. 4. Fleet Management Systems: Fleet Management System where position is recorded and used as evidence to solve disputes with clients or employees. The system described provides an error-bounded position evidence.

All those applications have in common that not bounded navigation errors could imply errors with direct impact in commercial or legal aspects. E.g. erroneous charging for the use of certain infrastructure (in the case of road pricing) or erroneous fine for speeding in the case of traffic law enforcement applications).

DISCUSSION OF THE RELATED ART

Methods and algorithms for computing integrity of the user navigation solution are today largely available based on both RAIM algorithms and information provided by the GNSS Signals (e.g. computation of Protection Levels based on the information provided by the SBAS Signal in Space according to SBAS MOPS). The reference in the aeronautical field as navigation and integrity algorithms that we will consider as basis for innovation, will be the SBAS navigation (EGNOS in Europe and WAAS in United States), which follows the MOPS standard of the cited "Minimum Operational Standards for Global Positioning System/Wide Area Augmentation System Airborne Equipment," RTC/DO-229C, Nov. 28, 2001 ("[RD.1]" hereinafter), which is herein incorporated by reference, for navigation and integrity, in particular for the Precision Approach modes when the integrity of the navigation solution is checked or validated by a parallel RAIM algorithm. While the MOPS standard does not describe a particular RAIM algorithm, we will consider as reference the weighted RAIM for SBAS precision approach navigation described by the cited "Weighted RAIM for Precision Approach," T. Walter, P. Enge, ION GPS, 1995 ("[RD.3]" hereinafter), which is herein incorporated by reference.

Reference [RD.1] discusses (at Appendix J) the following equations:

$$HPL_{WAAS} = \begin{cases} K_{H,NPA} \cdot d_{major} & \text{for en route through } NPA \text{ modes} \\ K_{H,PA} \cdot d_{major} & \text{for precision approach mode} \end{cases}$$

$$VPL_{WAAS} = K_{V,PA} d_U$$

where:

$$d_{major} \equiv \sqrt{\frac{d_{east}^2 + d_{north}^2}{2} + \sqrt{\left(\frac{d_{east}^2 - d_{north}^2}{2}\right)^2 + d_{EN}^2}}$$

$$d_{east}^2 = \sum_{i=1}^{N} s_{east,i}^2 \sigma_i^2$$

= variance of model distribution that overbounds the true error distribution in the east axis.

$$d_{north}^2 = \sum_{i=1}^{N} s_{north,i}^2 \sigma_i^2$$

= variance of model distribution that overbounds the true error distribution in the north axis.

$$d_{EN} = \sum_{i=1}^{N} s_{east,i} s_{north,i} \sigma_i^2$$

= covariance of model distribution in the east and north axis.

$$d_U^2 = \sum_{i=1}^{N} s_{U,i}^2 \sigma_i^2$$

= variance of model distribution that overbounds the true error distribution in the vertical axis.

$s_{east}$ = the partial derivative of position error in the east direction with respect to the pseudorange error on the $i^{th}$ satellite $s_{north}$ = the partial derivative of position error in the north direction with respect to the pseudorange error on the $i^{th}$ satellite -continued $s_U$ = the partial derivative of position error in the vertical direction with respect to the pseudorange error on the $i^{th}$ satellite $$\sigma_i^2 = \sigma_{i,flt}^2 + \sigma_{i,UIRE}^2 + \sigma_{i,air}^2 + \sigma_{i,tropo}$$

where dmajor corresponds to the error uncertainty along the semimajor axis of the error ellipse.
For a general least squares position solution, the projection matrix S is defined as:

$$S = \begin{bmatrix} s_{east,1} & s_{east,2} & \cdots & s_{east,N} \\ s_{north,1} & s_{north,2} & \cdots & s_{north,N} \\ s_{U,1} & s_{U,2} & \cdots & s_{U,N} \\ s_{t,1} & s_{t,2} & \cdots & s_{t,N} \end{bmatrix}$$
$$= (G^T \cdot W \cdot G)^{-1} \cdot G^T \cdot W$$

where
the $i^{th}$ row of the geometry matrix G is defined as follows:

$G_i = [\cos El_i \cos Az_i \cos El_i \sin Az_i \sin El_i 1] = i^{th}$ row of G when positive azimuth is defined clockwise from North.

$$W^{-1} = \begin{bmatrix} \sigma_1^2 & 0 & \cdots & 0 \\ 0 & \sigma_2^2 & \cdots & 0 \\ \vdots & \vdots & \ddots & \vdots \\ 0 & 0 & \cdots & \sigma_N^2 \end{bmatrix}$$

For precision approach mode, $w_i = \sigma_i^2$

For modes other than precision approach, the weights are undefined. For an unweighted least-squares solution, the weighting matrix is a unity diagonal matrix ($w_i = 1$).
When the weights are equal to $\sigma_i^2$, the matrix $$\begin{bmatrix} d_{east}^2 & d_{EN} & d_{EU} & d_{ET} \\ d_{EN} & d_{north}^2 & d_{NU} & d_{NT} \\ d_{EU} & d_{NU} & d_U^2 & d_{UT} \\ d_{ET} & d_{NT} & d_{UT} & d_T^2 \end{bmatrix} = (G^T W G)^{-1}.$$

$HPL_{WAAS}$ Parameters
K
The value of $K_H$ for computing HPL is:

$$K_H = \begin{cases} 6.18 & \text{for en route through } NPA \text{ modes} \\ 6.0 & \text{for precision approach mode} \end{cases}$$

The value of $K_V$ for computing VPL is:

$K_V = 5.33$

When long term, fast, or range-rate corrections are not applied to a satellite, or if an ephemeris covariance type 28 message has not been received for the satellite but an active type 28 message has been received for a different satellite:

$\sigma_{i,flt}^2 = (60)^2 m^2$

All equipment is required to apply long-term and fast corrections when they are available. However, future systems may support an integrity-only mode where Type 6 messages are broadcast to provide integrity monitoring without corrections.
The $\sigma_{i,flt}^2 = (60)^2 m^2$ does not override an active "Don't Use" or a "Not Monitored". A "Not Monitored" can result from a UDREI=14 or when all UDREI data times out.
When WAAS-based ionospheric corrections are applied $\sigma_{i,UIRE}^2$ is the model variance for the slant range ionospheric error.
When GPS-based ionospheric corrections are applied:

$$\sigma_{i,UIRE}^2 + MAX\left\{\left(\frac{cT_{ions}}{5}\right)^2 \cdot (F_{pp} \cdot \tau_{vert})^2\right\}$$

c = the speed of light in a vacuum
$T_{iono}$ = ionospheric correction
$F_{pp}$ = obliquity factor $$\tau_{vert} = \begin{cases} 9 \text{ m}, & 0 \leq |\phi_m| \leq 20 \\ 4.5 \text{ m}, & 20 < |\phi_m| \leq 55 \\ 6 \text{ m}, & 55 < |\phi_m| \end{cases}$$

$\phi_m$ is the magnetic latitude as defined in Section 20.3.3.5.2.6 of ICD-GPS-200, "Navstar GPS Space Segment/Navigation User Interfaces".
Variance of Airborne Receiver Errors
The parameter, $\sigma_{i,air}$, shall be as follows:
For Class 1 equipment:

$\sigma_{i,air}^2 = 25 \text{ m}^2$

For Class 2, 3 and 4 equipment:

$\sigma_{air}[i] = (\sigma_{noise}^2[i] + \sigma_{multipath}^2[i] + \sigma_{divg}^2[i])^{1/2}$ The installed multipath error for the airborne equipment is described by the distribution, $N(0, \sigma_{multipath}^2)$ where:

$\sigma_{multipath}[i] = 0.13 + 0.53 e^{(-\theta[i]/10 \text{ deg})}$ (in meters)

$\theta[i]$ = elevation angle of satellite (in degrees)
$\sigma_{divg}[i]$ (in meters) shall be greater than or equal to the differentially-corrected pseudorange error induced by the steady-state effects of the airborne smoothing filter relative to the steady-state response of the filter defined in Section 2.1.4.1.1, given an ionospheric divergence that is defined to have a constant rate of 0.018 m/s.
If the airborne smoothing filter converges to a different steady state bias than the standard filter, a steady state error will remain which must be accounted for in $\sigma_{divg}$. When the smoothing filter is initialized or re-initialized the difference between the steady state response of the standard filter and the initial response of the filter does not need to be included due to the nature in which WAAS corrections are generated.
$\sigma_{noise}[i]$ (in meters) shall be standard deviation of a normal distribution that bounds the errors in the tails of the distribution associated with the GNSS receiver for satellite I, including receiver noise, thermal noise, interference, inter-channel biases, extrapolation, time since smoothing filter initialization, and processing errors.

The parameter $\sigma_{noise}$ must change to reflect current signal conditions. For example, degradation to system accuracy due to interference must be accounted for in the value of $RMS_{pr\_air}$ that is used in the protection level computations, within the time to alert.

The steady-state value of $(\sigma^2_{noise}[i]+\sigma^2_{divg}[i])^{1/2}$ at the minimum and maximum signal levels (Section 2.1.4.1.3) shall be as follows:

GPS Satellites Minimum signal level:
  a. $(\sigma^2_{noise}[i]+\sigma^2_{divg}[i])^{1/2} \leq 0.36$ meters for Airborne Accuracy Designator A, and
  b. $(\sigma^2_{noise}[i]+\sigma^2_{divg}[i])^{1/2} \leq 0.15$ meters for Airborne Accuracy Designator B GPS Satellites, Maximum signal level:
  a. $(\sigma^2_{noise}[i]+\sigma^2_{divg}[i])^{1/2} \leq 0.15$ meters for Airborne Accuracy Designator A, and
  b. $(\sigma^2_{noise}[i]+\sigma^2_{divg}[i])^{1/2} \leq 0.11$ meters for Airborne Accuracy Designator B SBAS Satellites, Minimum signal level:

$$(\sigma^2_{noise}[i]+\sigma^2_{divg}[i])^{1/2} \leq 1.8$$

SBAS Satellites, Maximum signal level:

$$(\sigma^2_{noise}[i]+\sigma^2_{divg}[i])^{1/2} \leq 1.0$$

These inequalities are consistent with the accuracy requirement defined in section 2.1.4.1

For en route through nonprecision approach modes, the value of $K_H$ was chosen to bound the user's position in two dimensions with a probability of $5\times10^{-9}$ per independent sample, assuming that the error is characterized by a Rayleigh distribution. A Rayleigh distribution is used because radial error needs to be bounded (both cross-track and along-track errors), using the worst case assumption that the semi-major and semi-minor axes are equal. It has been assumed that there are 10 independent samples per hour, and that half of the total integrity requirement ($10^{-7}$/hour) has been allocated to the HPL bounding probability.

For precision approach mode, the values of $K_H$ and $K_V$ were selected to bound the user's position in one dimension with a probability of $2\times10^{-9}$ and $10^{-7}$, respectively, assuming that the error is characterized by a Normal distribution. A Normal distribution is used because the aircraft needs to be protected in the vertical and the lateral axes. Only one dimension is used for the HPL, since the along-track tolerance is so much larger than the cross-track. The worst-case dimension is used. It has been assumed that there is only one independent sample per approach, half of the total integrity requirement ($2\times10^{-7}$/approach) has been allocated to the VPL bounding probability, and the HPL bounding probability has been made negligible.

When applying fast and long-term corrections, the parameter to be used is determined from the broadcast information. If the degradation parameters from Type 10 message are not applied a conservative bound of 8 m ($\sigma$) is used. If no collections are applied, a conservative estimate of the value of the corrections has been chosen based upon the maximum correction values. The maximum magnitude of the fast correction is 255 m, clock correction is 25 m (calculated over the time-out period of 360 seconds), root-sum-square long-term ephemeris corrections is 222 m (rotated to line-of-sight), long-term clock is 143 m (for a velocity code of 1). Since these quantities are independent, a reasonable maximum can be calculated by the rss of these terms, which is 368 m. Dividing by the en route through NPA K values yields approximately 60 meters for $\sigma_{i,flt}$.

The ionospheric delay residual is derived from broadcast data when ionospheric collections are applied. Otherwise, a conservative bound for the vertical delay is used depending on the pierce point latitude. To account for the possibility that erroneous values are broadcast by GPS in the navigation message, a scaled version of the GPS-based ionospheric correction is also used.

These values are consistent with the requirements and tests in Section 2.

The tropospheric delay residual has been based on an assessment of tropospheric errors.

Furthermore, Reference [RD.3] discusses (at sections 3.1-3.3) the following:

The basic linearized GPS measurement equation is $$y = G \cdot x + \epsilon$$

where x is the four dimensional position vector (north, east, up and clock) about which the linearization has been made, y is an N dimensional vector containing the raw pseudorange measurements minus the expected ranging values based on the location of the satellites and the location of the user (x), G is the observation matrix and $\epsilon$ is an TV dimensional vector containing the errors in y.

The weighted least squares solution for x can be found by $$x\sqrt{} = (G^T \cdot W \cdot G)^{-1} \cdot G^T \cdot W \cdot y \equiv K \cdot y$$

where the definition has been made for K (the weighted pseudo-inverse of G) and where W is the inverse of the covariance matrix. For simplification we will assume that the error sources for each satellite are uncorrected with the error sources for any other satellite. Therefore, all off-diagonal elements are set to zero. The diagonal elements are the inverses of the variances ($\sigma^2$s) corresponding to each satellite. While this assumption may not be strictly true, it should be a reasonably good approximation. The equations subsequently derived do not depend on this assumption. It only makes them easier to implement in practice.

Because the satellites are weighted unequally, we can no longer separate the expected positioning errors into a geometrical factor (DOP) and a user ranging accuracy (URA, or f, common to all satellites). Instead these values are combined into expected positioning confidences. Instead of VDOP given by $$VDOP = \sqrt{[(G^T \cdot G)^{-1}]_{33}}$$

we now have $\sigma_V$ given by $$\sigma_V = \sqrt{[(G^T \cdot W \cdot G)^{-1}]_{33}}$$

as a measure of the confidence of the vertical accuracy. In a similar manner the horizontal confidence HRMS can be given by $$HRMS = \sqrt{[(G^T \cdot W \cdot G)^{-1}]_{11} + [(G^T \cdot W \cdot G)^{-1}]_{22}}$$

These measures give the 1-sigma expected accuracy in the vertical dimension and the 2-dimensional RMS expected accuracy in the horizontal dimensions respectively. The accuracies of these measures depend on the accuracies of the satellite covariances in the W matrix.

So far we have only presented the weighted position solution. Now we wish to assess the accuracy of the least squares fit to the data. The quantity we are most interested in is the positioning error ($x\sqrt{}-x$). Unfortunately it is not possible to obtain a direct measurement of this quantity, unless we were to have access to an independent, more accurate positioning system. Instead, we can examine the overall consistency of the solution. Provided we have more than four measurements, the system is overdetermined and cannot be solved exactly. This is why a least squares solution is performed in the first place. Since all of the conditions realistically cannot be met exactly, there is a remaining error residual to the fit. By quantifying how closely we were able to make all the observations agree, we can get an estimate of the goodness of the fit. Then we make the assumption that if the fit was good, the error in position is most likely small. This is the foundation for RAIM.

We can get an estimate of the ranging errors from the least squares fit and the basic measurement equation $$e\sqrt{} = y - G \cdot x\sqrt{} = (I - G \cdot K) \cdot y \equiv (I - P) \cdot y$$

where the definition has been made $$P \equiv G \cdot K = G \cdot (G^T \cdot W \cdot G)^{-1} \cdot G^T \cdot W$$

From these error estimates we can define a scalar measure defined as the Weighted Sum of the Squared Errors $$WSSE = e\sqrt{}^T \cdot W \cdot e\sqrt{} = [(I-P) \cdot y]^T \cdot W \cdot [(I-P) \cdot y]$$

which is equivalent to $$WSSE = y^T \cdot W \cdot (I-P) \cdot y$$

We use $\sqrt{WSSE}$ as our test statistic in order to judge the goodness of the least squares fit. This statistic is observable whereas the positioning error of the least squares solution ($x\sqrt{} - x$) is not. Therefore, for integrity purposes we want to use the statistic to flag bad position solutions. Typically, a certain threshold is selected. If the statistic exceeds that threshold the position fix is assumed to be unsafe. However if the statistic is below the threshold, then the position fix is assumed to be valid. Thus, the statistic-vertical error plane is broken up into four regions consisting of: normal operation points, missed detections, successful detections and false alarms (See FIG. 1). Ideally, there would never be any missed detections or false alarms.

The threshold T, is chosen such that the probability of false alarm is commensurate with the continuity requirement for precision approach. Under normal conditions, if we assume $\epsilon_i$ is a normally distributed zero mean random variable with a standard deviation of $\sigma_i$ for all TV satellites in view, then the statistic is a chi-square distributed variable with N−4 degrees of freedom. Therefore the threshold T can be selected analytically. $T(N, P_{FA})$ will only be a function of the number of satellites (N) and the desired probability of false alarms ($P_{FA}$). By examining the distribution it is possible to find the value $T(N, P_{FA})$ such that, for normal conditions, the statistic only has a probability of ($P_{FA}$) of exceeding it. Given the probability of false alarms, the threshold is found by inverting the incomplete gamma function [5] [9] [10]

$$1 - P_{FA} = \frac{1}{\Gamma(a)} \int_0^{T^2} e^{-s} s^{a-1} ds$$

where a is the number of degrees of freedom divided by two, or in terms of the number of measurements N $$a = \frac{N-4}{2}$$

The best way to find the values for $T(N, P_{FA})$ is through an iterative root finding process. Note that these values can be easily computed beforehand and stored for use later in a RAIM algorithm.

Unfortunately, the N errors in the vector are mapped into two orthogonal spaces; one of dimension 4 corresponding to the position solution error and one of dimension N−4 corresponding to our statistic. Thus, in the most general case, the statistic cannot be used absolutely to indicate a bad or a good position solution. However, in the case of a single satellite failure, it is possible to restrict the satellite geometries such that a large bias that is mapped into a position error is also mapped into the statistic with certainty. Thus, for this failure mode we can guarantee that the position error will not grow too large without a corresponding growth in the statistic.

This restriction is not necessarily unreasonable because it is assumed that ground monitoring will pick up and isolate any faulty satellite within a relatively short period of time. Thus the likelihood of multiple satellite errors not detected by the ground monitoring network are expected to be exceedingly small.

We can use the method developed by Brown [5] to guarantee integrity by only accepting geometries which provide adequate redundancy to determine if there is an error on any one channel of the receiver. This method trades availability for integrity. In the vertical dimension, this method requires that the vertical slope for each satellite (i), given by [6]

$$Vslope_j = \frac{|K_{3i}|\sigma_i}{\sqrt{1-P_{ii}}}$$

be less than some maximum allowable slope.

If there is a failure of a single satellite, the expected distribution of operation points in the statistic-vertical error plane is still an ellipse with roughly the same contours as in the absence of failures. The difference is that now the ellipse is no longer centered near the origin. Instead, its center has moved out along the line with the corresponding Vslope for the failed satellite (see FIG. 1b). How far it moves along the line depends on the magnitude of the bias. A valid integrity algorithm should alert the pilot to this failure before the vertical error exceeds the desired vertical integrity limit (VIL), thus keeping all points in this ellipse out of region of missed detections.

From FIG. 1b we can see that the maximum allowable slope is a function of the desired probability of false alarms, the acceptable probability of missed detection, the vertical error we are trying to protect and $\sigma_V$ [6]. Integrity is only declared available if each Vslope is less than $$\frac{VIL - k(P_{MD})\sigma_V}{T(N, P_{FA})}$$

where $k(P_{MD})$ is the number of standard deviations corresponding to the specified $P_{MD}$.

Another point of view is to assume the WAAS ground network will provide a sufficient level of integrity. Instead we now wish to determine how much additional integrity RAIM can provide. The equation above can be rearranged to give the vertical protection level that the fault detection algorithm is capable of protecting ($VPL_{FD}$ or $HPL_{FD}$ in the horizontal plane). These values are given by $$VPL_{FD} = \max[Vslope]T(N,P_{FA}) + k(P_{MD})\sigma_V$$

$$HPL_{FD} = \max[Hslope]T(N,P_{FA}) + k(P_{MD})HRMS$$

While this analysis determines the capability of RAIM in the presence of a single satellite failure, this form of RAIM cannot be made robust against any type of multiple satellite error. One can always conceive of a satellite pair failure that would yield zero contribution to the statistic and yet result in a large positioning error. However, RAIM is one layer of a multi-layer integrity structure. It cannot guarantee catching all errors, but no system can. Despite these limitations, RAIM would very likely detect a random multi-satellite failure. In addition, the probability of this failure mode occurring and escaping the detection of both the WAAS ground network and the local monitor is extremely remote.

Major limitations of the existing methods are that they are based on certain assumptions that while valid for some applications (e.g. in Civil Aviation) they cannot be verified when receiver is working in non controlled environments, as it is the case of urban and, in general, terrestrial applications.

Such assumptions are based on a-priori information on the quality of the measurements, which is not cross-checked with the real conditions measured by the receiver and which do not take into account the effect of uncontrolled error sources. This is the case of the standard RAIM technology that is being widely used with standardized specifications in the aeronautical field. This technique implies a set of assumptions that are valid in the aeronautical field including: 1. RAIM algorithms make the assumption of the single failure: only one measurement in view will fail, while the other measurements have a nominal behaviour. The source of the single failure is assumed to be a failure of one satellite transmitting the signal, an enough scarcely event to happen only to a single satellite; and 2. The nominal behaviour is characterised "a priori" by a noise level in the Satellites Navigation pseudorange measurements. This "a priori" noise level correspond to a permanent measurements model noise that characterizes the clean scenario. In GPS, before year 2000 this model corresponded to the Selective Availability as the dominant noise, having all the satellites a noise level of about 30 m. Since year 2000 the pseudorange measurements have reduced their noise level drastically to low values but function of the elevation and other parameters. The "a priori" measurement noise model of GPS case can be found in [RD.2], while the "a priori" measurement noise model of the case with SBAS corrections is described in [RD.1]

These two hypotheses are not applicable in the urban and road environments. In these scenarios, the dominant sources of errors in the satellite measurements are the local effects, in the vicinity of the receiver, mainly the multipath and the direct reflected signals (tropospheric errors are already accounted in the mentioned MOPS standard). In contrast to the scarcely single satellite failure, this effect acts continuously over several satellites, with a very variable error magnitude up to tenths of meters. This makes the single failure hypothesis and the "a priori" pseudorange measurements noise model not applicable.

In urban environment two types of main errors have to be considered: the multipath.sup.1 properly said where signal composed of the direct and the reflected signals and the also common case of receiving only a reflected signal. The mitigation methods at HW level in high performances receivers are being highly effective for the composed signal (multipath) while can not detect the case of only reflected signal. In addition, the pseudorange smoothing methods are also able to damp partially the multipath in the composed signal taking advantage of the different behaviour of the carrier phase and the pseudorange observables. However for the only reflected signal the pseudorange and carrier phase are consistent and these pseudorange smoothing filters are not applicable.
.sup.1For the sake of simplification the term multipath is used along this document to cover this effect and also the reception of only the reflected signal. Whenever necessary the term will be characterized to refer to one or the other effect.

Other factor to be considered is the different multipath behaviour depending on the receiver dynamics. In static receivers both types of multipath are perceived in first approach as bias, while the receiver dynamics makes that the composed multipath is seen in first approach as noise (measurements in locations more distant than one wave-length are de-correlated) and in the case of the only reflected signal, the Doppler effect due to the projection of the receiver velocity in the signal path is different than in the line of sight of the expected nominal signal. Proposed method considers then the user velocity as a variable for the integrity algorithm.

Moreover current methods are focused on safety critical applications what implies that real time solution (integrity assessed every epoch for each computed navigation solution and delivered at that epoch) and not use of sequential filters are a must.

Maps data integrity is still an open issue what implies that map-matching technologies cannot be used as a means for improving solution integrity.

All those limitations of the state of the art precludes the GNSS applications for the so called "liability critical applications" in non controlled environments.

SUMMARY OF THE INVENTION

The presented innovation consists basically on the extension of the navigation integrity, fully developed for the aeronautical field, to the terrestial field with the urban and road environments as reference scenario. This extension requires a set of modifications and innovations in the navigation and integrity algorithms to deal with multiple potential sources of error in the measurements affecting to several satellites measurement simultaneously, instead of the clean aeronautical environment where the dominant error source are the satellite ephemeris and clock errors and the ionospheric errors and those error sources are properly bounded as part of the integrity services (e.g. UDRE and GIVE in the SBAS standard).

The SBAS systems, currently implemented by EGNOS in Europe and by WAAS in United States, are an overlay to GPS that determines the integrity of the GPS satellites at signal in space (SIS) level, at the same time that corrections to the pseudoranges are provided for an improved navigation accuracy. Therefore the SBAS systems provides the mentioned bounds and informs to the user receiver about which are the healthy satellites that can be used for positioning and GARAI will be using measurements of satellites with due SBAS integrity.

The remaining sources of errors in the measurements will be the local effects, usually dominated by the multipath. The SBAS navigation solution and integrity algorithms use a pseudorange measurement noise model defined in the Appendix J of [RD.1] for each i-satellite as:

$$\sigma^2_i = \sigma^2_{i,flt} + \sigma^2_{i,UIRE} + \sigma^2_{i,air} + \sigma^2_{i,tropo}$$

where the different terms are:

$\sigma^2_{i,flt}$ model variance for the fast and slow long term corrections residual error.

$\sigma^2_{i,UIRE}|$ model variance for the slant range ionospheric correction residual error.

$\sigma^2_{i,air}|$ model variance of the airborne receiver errors, which is composed of the terms:

$$\sigma^2_{i,air} = \sigma^2_{i,noise} + \sigma^2_{i,multipath} + \sigma^2_{i,divg}|$$

$\sigma^2_{i,noise}$: Variance of a normal distribution that bounds the errors in the tails of the distribution associated with the GNSS receiver for satellite i, including receiver noise, thermal noise, interference, inter-channel biases, extrapolation, time since smoothing filter initialization, and processing errors.

$\sigma^2_{i,multipath}|$: Variance of the zero mean normal distribution of the airborne equipment multipath error, function of the satellite line of sight elevation angle.

$\sigma^2_{i,divg}$: Variance of the differentially-corrected pseudorange error induced by the steady-state effects of the airborne smoothing filter, given the ionospheric divergence, due to the evolution of the slant delay evolution with the time.

$\sigma^2_{i,tropo}|$ model variance of the residual error for equipments that apply the tropospheric delay model described in the MOPS.

In urban environment this model, with the information broadcast by SBAS systems and by the GPS messages, is yet valid for the SIS level terms (Fast and slow long terms, ionospheric and tropospheric delay terms) and the receiver hardware noise term $\sigma^2_{i,noise}|$, but the local effects, dominated by the non controlled multipath, will follow a totally different statistic than the clean background multipath environment considered in the MOPS specification. There are two approaches to manage this effect that will be used simultaneously in GARAI: 1. Those pseudorange measurements with very large range errors will be rejected. 2. The variance of the pseudorange measurements noise, dominated by the multipath, $\sigma^2_{i,multipath}$, will be characterised each epoch, using the measurements.

Our innovation takes advantage of the behaviour of the different types of multipath (composed direct plus reflected signal and only reflected signal) in presence of the receiver dynamics to develop efficient methods to reject degraded measurements and to characterise the measurements noise with $\sigma^2_{i,multipath}|$ for navigation. The receiver dynamics makes that the composed signal with multipath is seen in first approach as noise (measurements in locations more distant than one wave-length are de-correlated) and in the case of the only reflected signal, the Doppler effect due to the projection of the receiver velocity in the signal path is different than in the line of sight of the expected nominal signal.

A possible but non exclusive implementation of these ideas in a new approach to the computation of the positioning integrity in non controlled environments (like the urban case) is summarised in the following paragraphs. This new approach is an enhanced RAIM algorithm that includes new and modified characteristics over the classical approach: The pseudorange step detector, as basic method to screen out failing measurements in the traditional approach, is replaced by a more exhaustive pre-processing for measurement characterisation, with the twofold objective of rejecting the pseudoranges with large errors and to characterise the properties of the pseudorange measurements susceptible of being used for navigation. Mitigation and rejection methods of the only reflected signal is achieved based on the following steps: 1. Carrier Phase pre-processing. The classical RAIM algorithms for positioning are based on the pseudorange measurements. We introduce here the use of the carrier phase measurements, the computation of receiver velocity and this same receiver velocity as resources to screen out with a configurable confidence level the erroneous measurements. 2. Carrier Phase RAIM. As part of the pre-processing stage the RAIM algorithm is adapted to be applied on the Least Squares on the Carrier Phase measurements to compute the vector of position change between measurement epochs, or velocity vector. Due to the small noise of the nominal Carrier Phase measurements, in the order of several milimeters or the centimeter level, this test provides a high observability on carrier phase inconsistencies. This is more evident in the case of the only reflected signal that follows a path totally different from the nominal, what makes it being affected by the Doppler effect in a totally different amount. Multipath characterisation. Mitigation and rejection methods of the signal composed of direct and reflected components: Pseudoranges smoothing and Error variance estimation. The stage of pseudoranges smoothing with carrier phase is enhanced to serve for multiple purposes: smoothing of pseudoranges, characterisation of the noise of the raw and smoothed pseudoranges, plausibility test on raw pseudoranges and rough multipath detector. This method is specially effective with receiver motion over the signal with multipath, composed of direct and reflected signal. Pseudoranges weight update. The noise measured in the smoothed pseudoranges will fed the adaptive pseudorange noise model identified above to compute the pseudoranges weight matrix to be used in the navigation and the RAIM based Protections level computation. Navigation and integrity with RAIM: The "a priori" model fixed pseudorange measurement weight matrix used in the navigation and RAIM algorithms, specified in [RD.1], is replaced by the adaptive Pseudoranges weight matrix updated each epoch. The Protection Levels, based in the weighted RAIM single failure detection described in [RD.3], are enhanced to be computed in any multiple failure condition. The computation of these Protection Levels in any generic multiple failure case is a generalisation of the development for the double failure case described in [RD.6].

The result of all these innovative enhancements to the current RAIM schemes will allow on one hand to screen out the measurements with large errors from the computation of the positioning, on the other hand to properly characterize the pseudoranges to be used for positioning, and finally, with this consistent information of the pseudorange characteristics, the adaptive RAIM algorithm in position will determine the protection level of the computed position with the required integrity or confidence Level.

DETAILED DESCRIPTION OF THE PREFERRED EMBODIMENTS

Figure 1A:
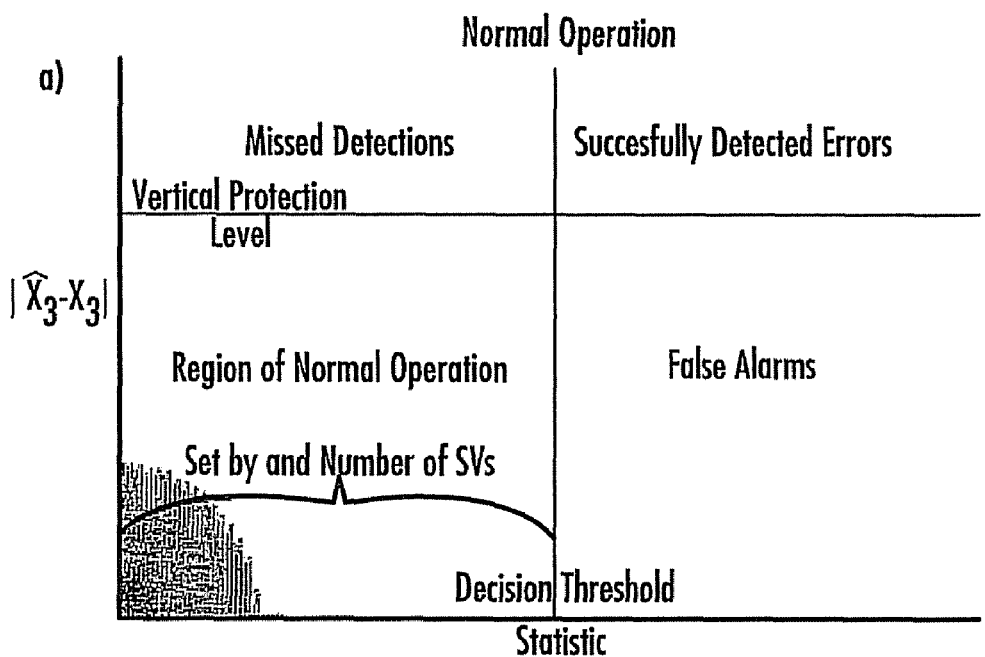
FIG. 1a is a prior art statistical depiction of a normally operating satellite.
Figure 1B:
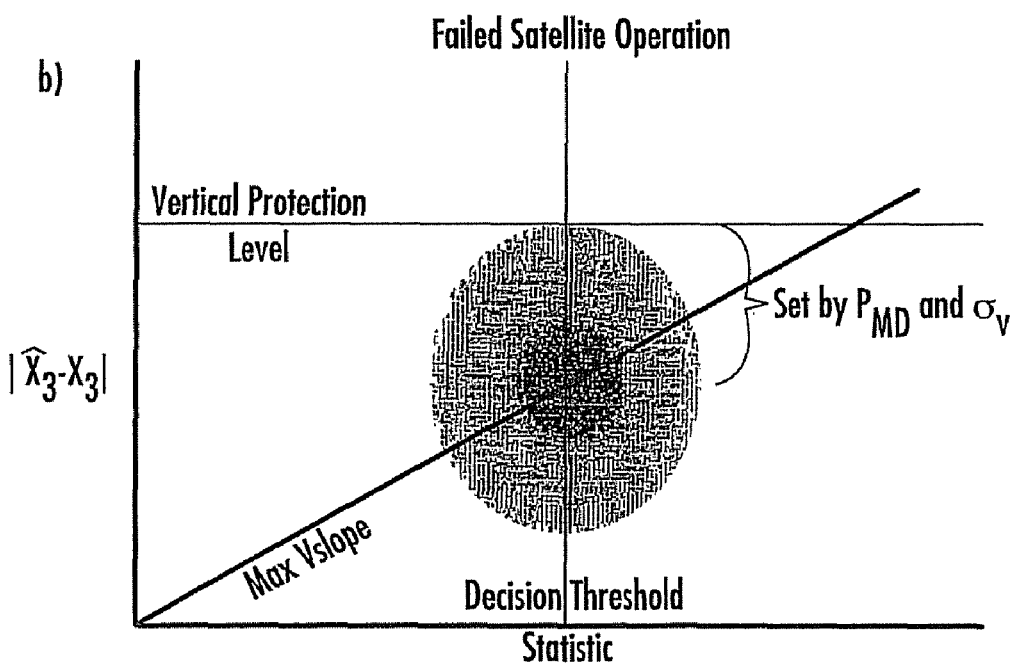
FIG. 1b is a prior art statistical depiction of a satellite operating under failed conditions.
Figure 2:
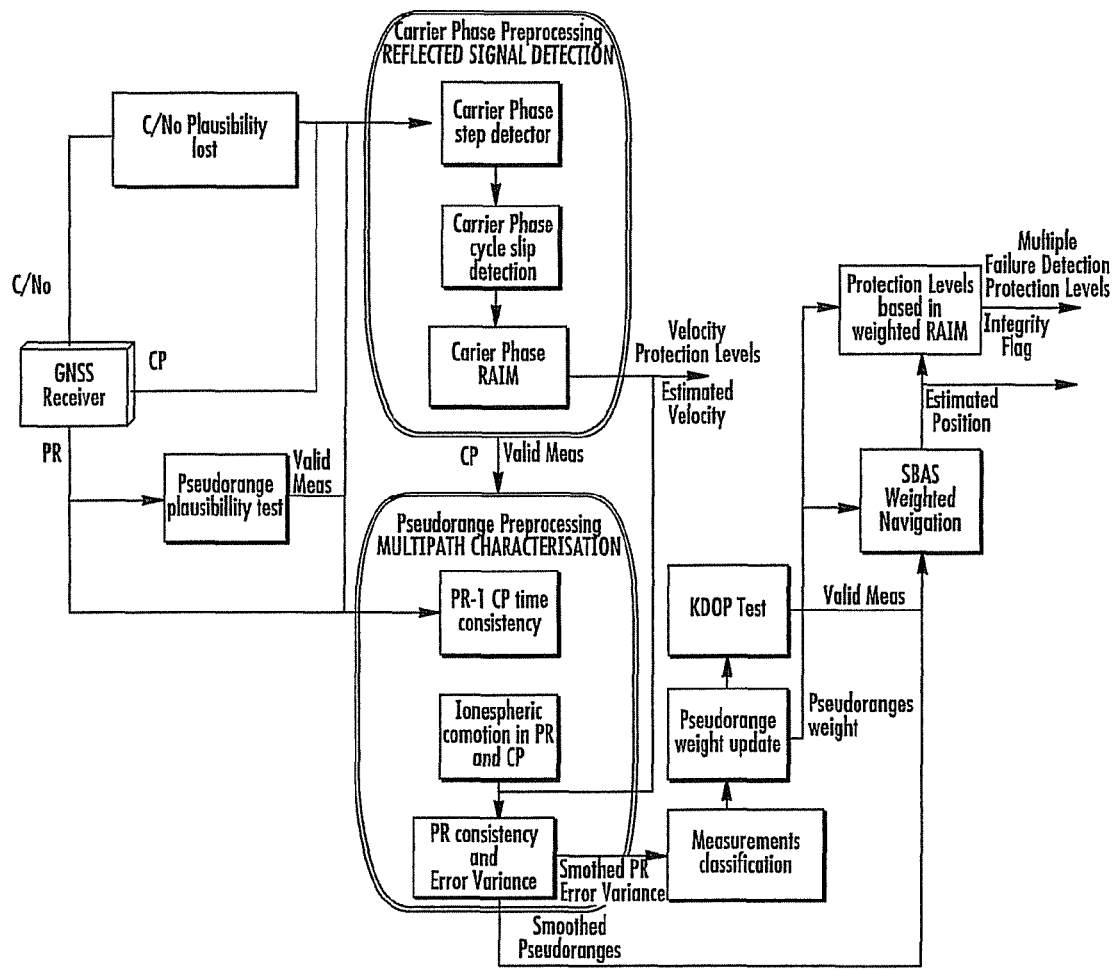
FIG. 2 illustrates the overall algorithms architecture, which can be used to implement one embodiment, identifying the main components, and in particular highlighting the claimed innovations in the present invention.
Figure 3:
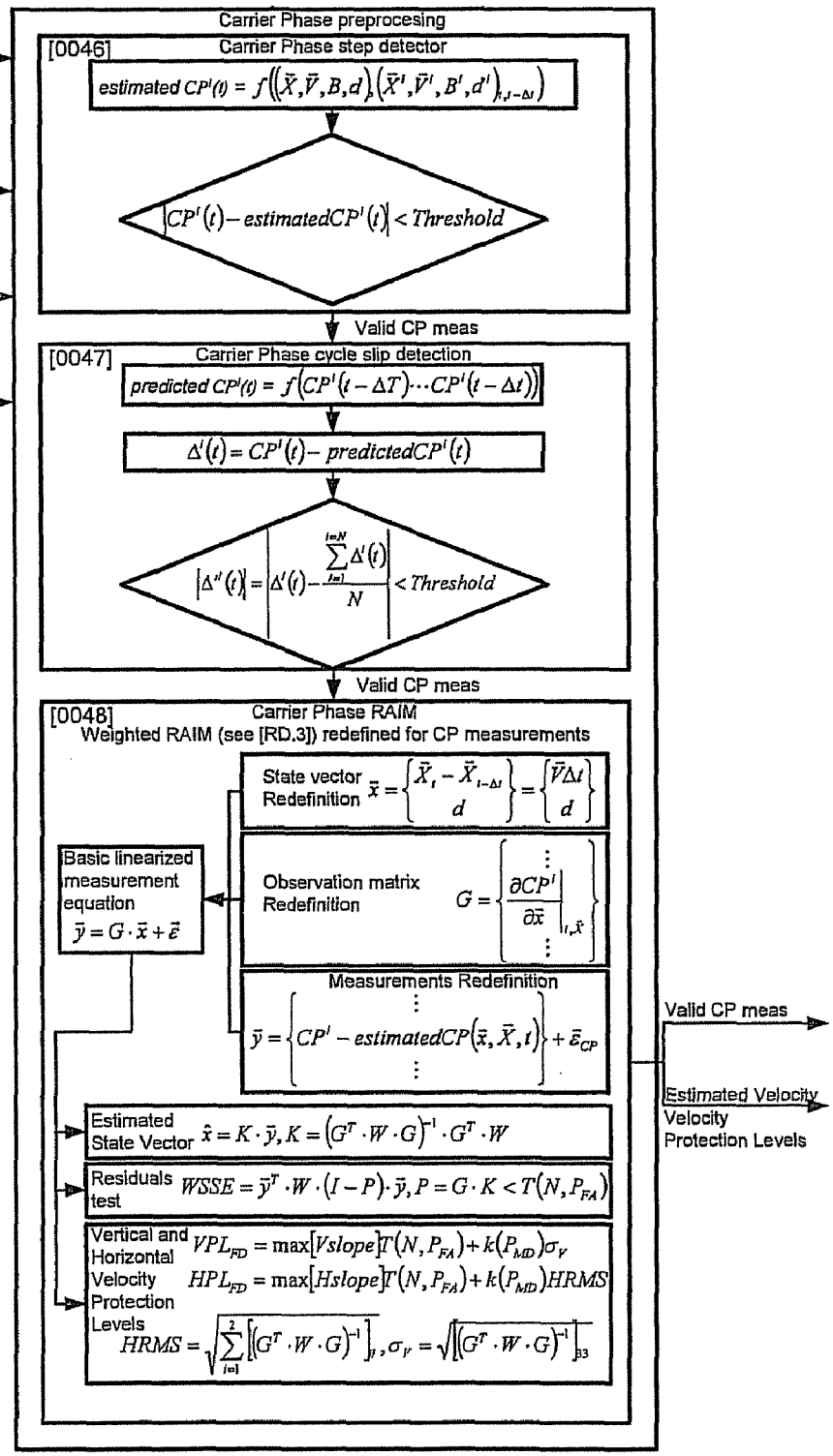
FIG. 3 illustrates a flow chart in accordance with an exemplary embodiment of the invention.
Figure 4:
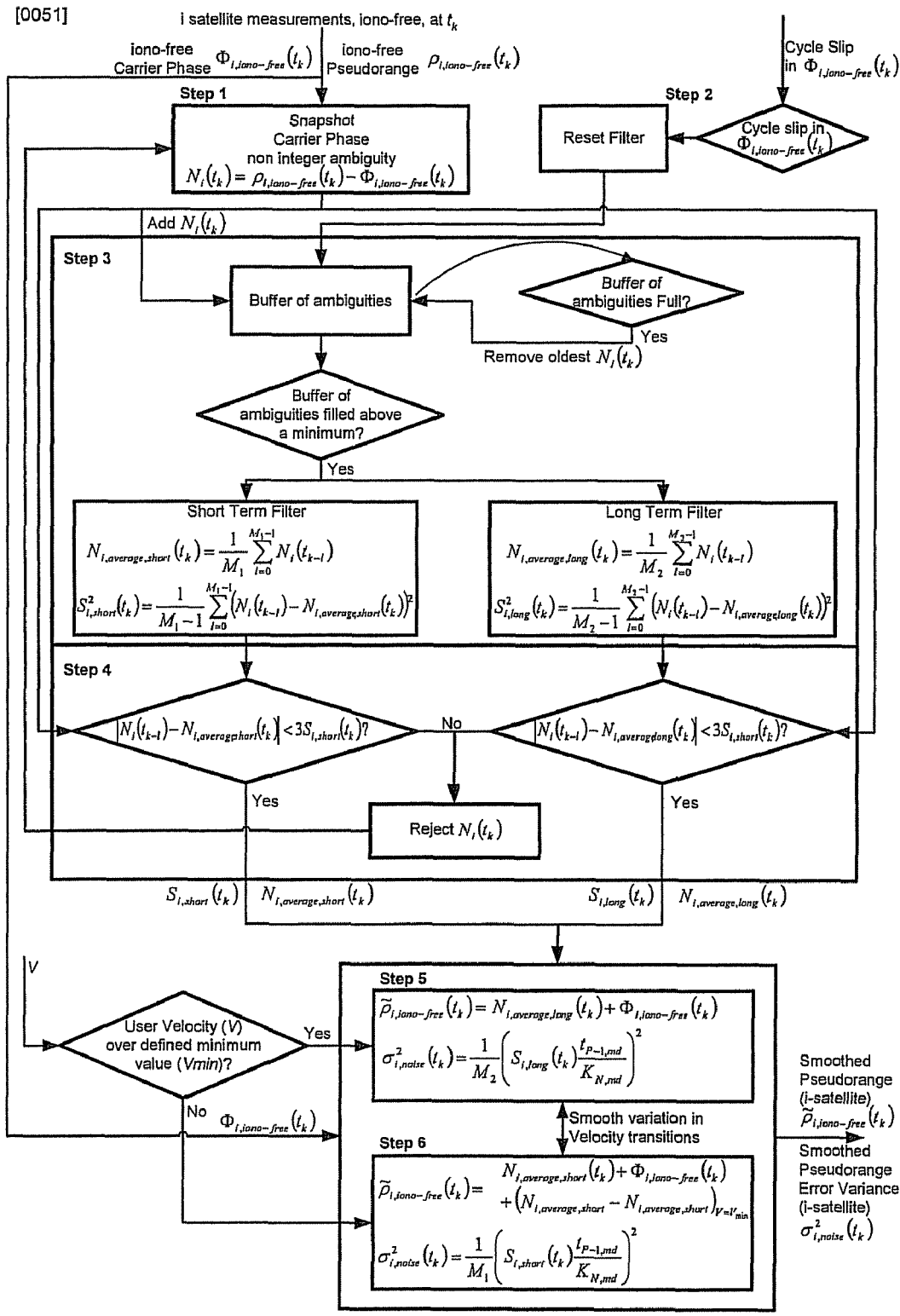
FIG. 4 illustrates a flow chart in accordance with an exemplary embodiment of the invention.
Figure 5:
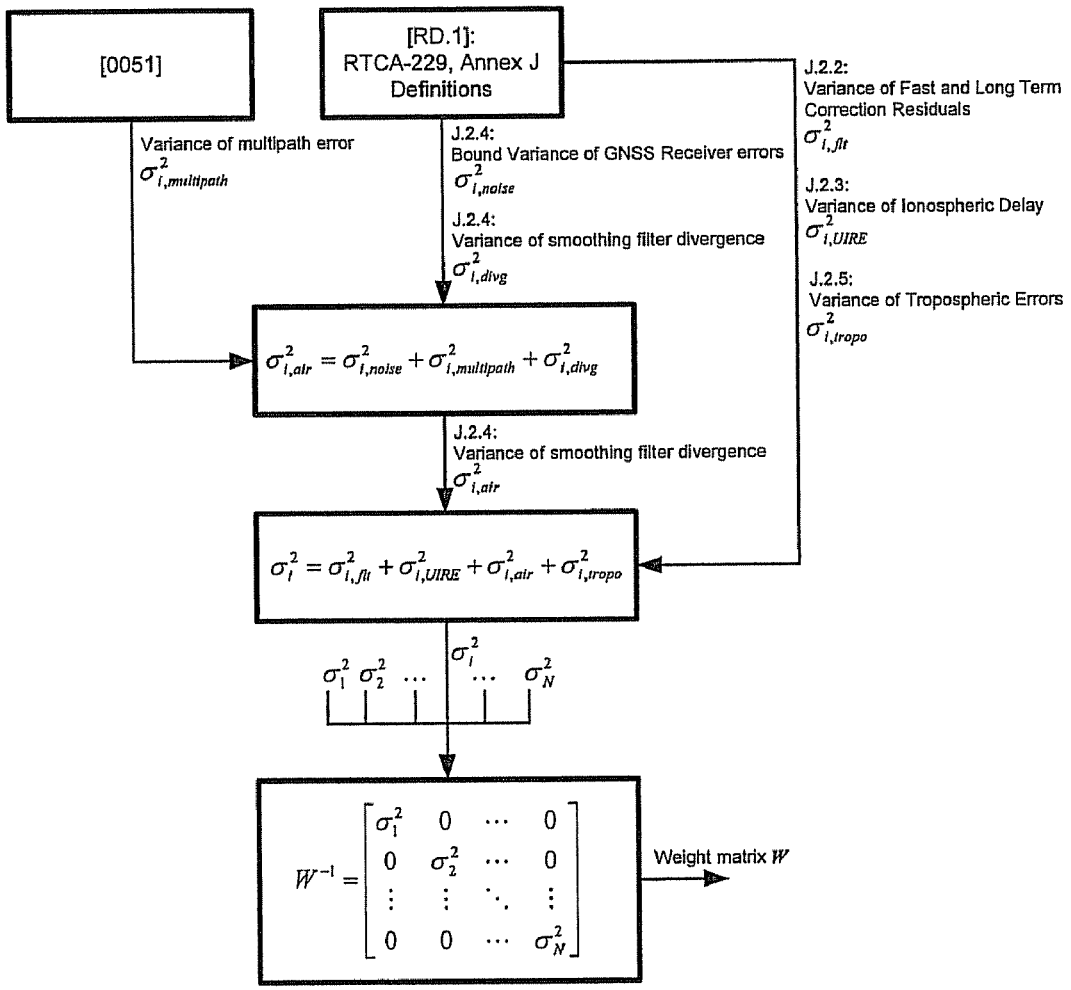
FIG. 5 illustrates a flow chart in accordance with an exemplary embodiment of the invention.
Figure 6:
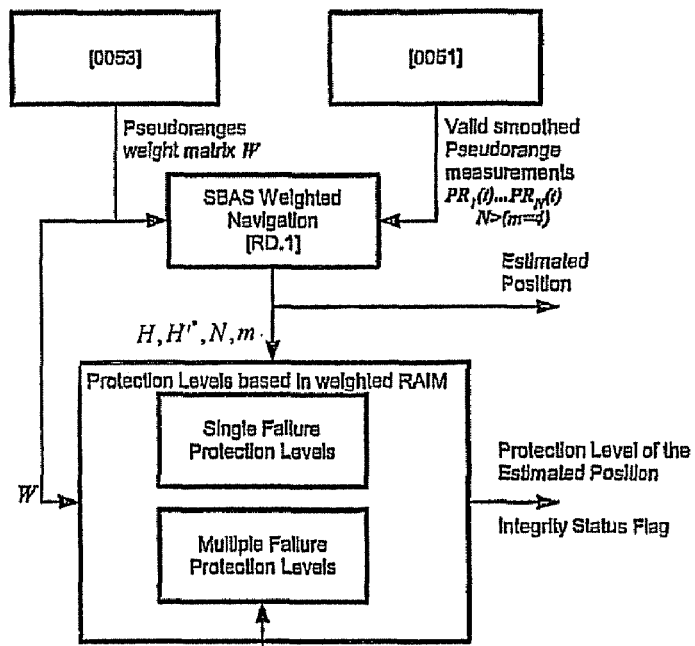
FIG. 6 illustrates a flow chart in accordance with an exemplary embodiment of the invention.
Figure 6:
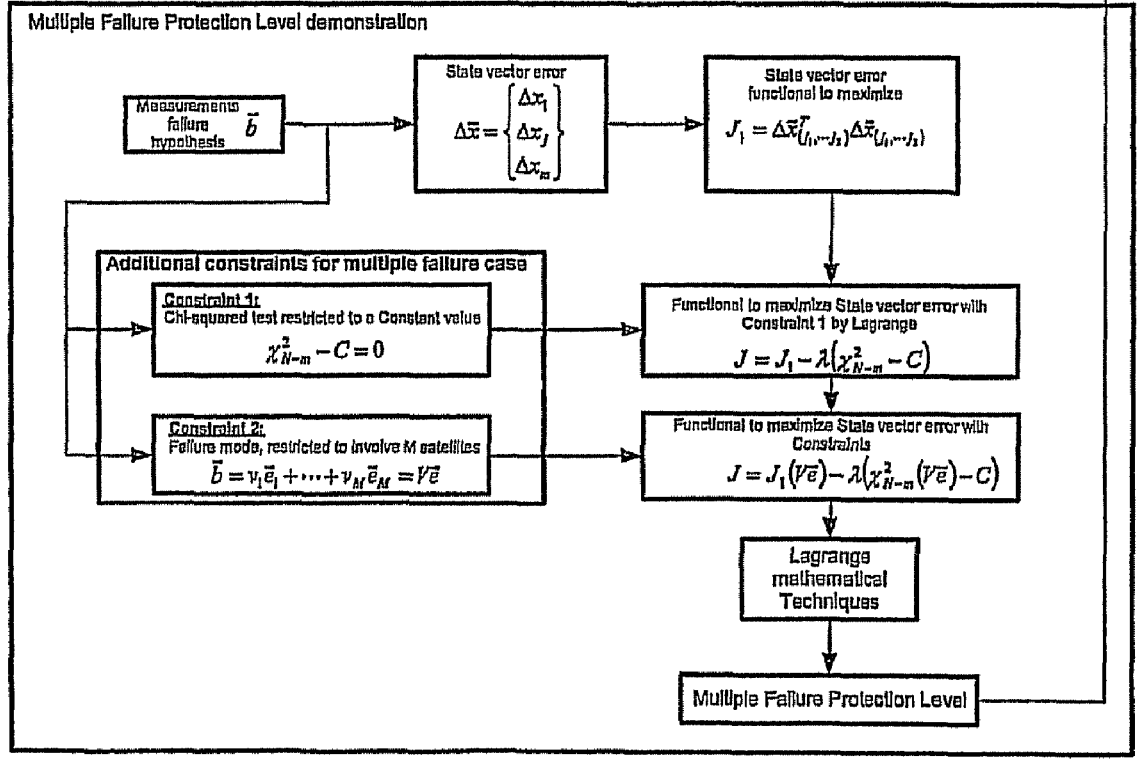

Reference will now be made in detail to the embodiment of the invention, a method for guaranteeing the integrity of the navigation solution in non-controlled environments based on the service integrity included in a GNSS Signal in Space (from SBAS system today and GBAS, Galileo and GPS-III in the future). While the invention will be described in conjunction with the preferred embodiments, it will be understood that they are not intended to limit the invention to these embodiments.

The objective of the proposed methods is the computation of the navigation solution (position, velocity and/or time) error bounds (also known as Protection levels in the civil aviation world) that guarantees the required level of integrity, i.e. that ensures that the probability of the error being larger than the mentioned error bound is below certain probability, and also the computation of a flag of validity of the navigation and integrity outputs.

Method ensures the validity of the mentioned Protection Levels even in case that the user is in a non controlled environment. Integrity is taken priority w.r.t. solution availability what implies that conservative mechanisms are implemented to identify and reject measurements or position and integrity outputs suspicious to have large errors.

Invented method includes specific algorithms that detects situations with measurements that can be subject to excessive multipath errors in such a way that if they can be identified then they are not considered in the computation of the navigation solution, or if they can not be identified the navigation and integrity solution is invalidated.

Invented method generalises the computation of the error bounds as defined today in the corresponding RTCA MOPS (based on the assumption of a controlled environment, in particular with reduced multipath) to a non-controlled environment by screening out suspicious wrong measurements, using only not rejected measurements and including additional margins for the computation of protection levels to account for residual multipath errors.

The invented method consists on a pre-processing, preceding the position and integrity computation, that will be responsible for the characterisation of pseudoranges and of a first set of measurements rejections. Later, for navigation and integrity computation, a RAIM scheme will be used, what will allow a final rejection of not properly characterised pseudoranges. For this purpose a weighted RAIM algorithm will be used.

The corresponding algorithms consists of the following steps that are individually described in the following paragraphs. Detailed description is later provided for those new algorithms that are specific part of this invention. The steps are:

1) Preprocessing, which includes General Preprocessing (Carrier to noise plausibility test, Pseudorange plausibility test), Carrier Phase preprocessing (Carrier phase step detector, Carrier phase cycle slip detector, Carrier phase RAIM [invention]),Pseudorange preprocessing (Pseudorange verus carrier phase time consistency test, Ionospheric correction for pseudorange and carrier phase, Pseudorange smoothing and error variance estimation [invention]), and Measurement classification.

2) Navigation and integrity computation, which includes Pseudoranges weight update [invention], KDOP test, SBAS weighted navigation, and Protection level computation based on weighted RAIM for multiple failure case [invention]

Preprocessing:

General Preprocessing:

Carrier to noise plausibility test. Nominally the C/N0 of the received signal depends of the satellite elevation and secondarily of the satellite broadcast power and of the receiver antenna gain pattern. A threshold of minimum allowed C/No as function of the satellite elevation will allow to reject those satellites with signal power attenuated by trees canopy or by multipath with the carrier of the reflected signal in opposite phase. The threshold as function of the elevation can be calibrated continuously with the measured C/No for the satellites in view with the maximum elevation.

Pseudorange plausibility test. Pseudorange plausibility check, on the values of the full pseudoranges. The approach for this algorithm relies on the computation of predicted ranging measurements which are more or less accurate, based on the information coming previous epochs and the navigation messages broadcast by the satellites applied to the time when the plausibility has to be checked.

Carrier Phase Preprocessing:

Carrier phase step detector. With the last estimation of receiver position and velocity, receiver and satellites clock bias and drift, and the last and the current satellite position and velocity, ranges of plausible carrier phases measurements of all the satellites can be estimated. This allows to reject all the measurements of those satellites with highly deviated Carrier Phases.

Carrier phase cycle slip detector. The purpose of this algorithm is to detect discontinuities in the carrier phase measurements due to cycle slips. No attempt will be made to repair the cycle slips and thus only a detection flag for each active satellite will be provided. The proposed algorithm is based on the generation of a predicted carrier phase measurement for the current epoch based on the last ones, and the comparison with the incoming carrier phase. If the difference between both is greater than a certain threshold, then it is considered that there has been a cycle slip, and the filter is therefore reset. Additionally the receiver clock stability is not assumed to be good, and consequently a mechanism has to be implemented in order to avoid considering a clock jump as a cycle slip. This is based on the fact that the clock jump appears in all the measurements as a cycle slip of the same magnitude, assuming that the short-term stability of the code and phase interchannel bias is sufficiently good.

Carrier phase RAIM [invention]. RAIM in the accumulated carrier phase between measurement epochs. The objective is twofold: to check the consistency between the carrier phase measurements in one epoch and to estimate the increment of position between measurement epochs, or velocity, of the receiver. The formulation of the RAIM algorithms for positioning with pseudoranges, like the weighted RAIM algorithm described in [RD.3], is applicable redefining the state vector, the input data, and the RAIM parameters. The state vector, receiver position vector and clock bias, is replaced by the receiver increment of position and clock drift between measurement epochs.

As input data, the following modifications have to be made: As measurements, the pseudoranges are replaced by the accumulated carrier phase between the previous and the current epoch. The measurement noise, used to build the weight matrixes, is now defined by the noise of the "a priori" nominal accumulated carrier phase measurement, which depending on the receiver can vary from a few milimeters to about two centimeters. The observation matrix, named G in [RD.3], will be, as usual, the partial derivate of the measurement equation with respect to the state vector. As the measurements and state vector are now different than in the classical positioning RAIM with pseudoranges the observation matrix will have a very different expression.

The main RAIM parameter, the threshold for the valid quadratic sum of measurements residuals, will have to be scaled to the values and units of the measurement noise considered now, but keeping the False Alert and Missdetection probabilities.

Pseudorange Preprocessing:

Pseudorange verus carrier phase time consistency test. The pseudorange validation is based on the comparison between the pseudorange temporal evolution and the carrier phase temporal evolution, provided that no cycle slip has occurred, what has been tested above. If the difference is greater than a given threshold, then the new incoming pseudorange measurement is rejected. If this happens, the previous carrier phase and pseudorange are held internally for the comparison in the next epoch. This check may be reset by two reasons: either there has been a detected cycle slip, or the number of consecutive rejected pseudorange measurements is sufficiently high so as to have a significant code/carrier divergence due to the evolution of the ionospheric delay.

Ionospheric correction for pseudorange and carrier phase. The objective of this algorithm is to estimate the ionospheric delay and correct the ranging measurements. It will also provide the uncertainty of the correction in terms of the variance of the residual error. The computation of the ionospheric delay will be performed according to the approach defined in appendix A of MOPS (see reference [RD.1] for additional details). The SBAS systems broadcast the vertical ionospheric delays for a predefined set of grid points (IGP), as well as the estimated variance for the residual error. The first step is to computed for each active satellite the position of the corresponding Ionospheric Pierce Point (IPP), which is the intersection between the satellite-to-user Line of Sight (LOS) and an ellipsoid with constant height of 350 km above the reference system ellipsoid; then the surrounding IGPs are identified, and the user ionospheric vertical delay together with the associated error variance are obtained by means of an interpolation scheme according to [RD.1]. Finally the slant values are generated using an obliquity factor which is a function of the satellite elevation.

Note that the pseudorange smoothing algorithm will compute a non-integer carrier phase ambiguity based on the comparison of the iono-free pseudorange and carrier phase measurements. It is assumed that the error in the ionospheric correction will not change during the time interval of measurements considered for smoothing. If this assumption is not considered, the error variance provided by this algorithm should be enlarged to account for this effect.

Pseudorange smoothing and error variance estimation [invention]. The aim of this function is to interpolate the pseudorange measurements to an intermediate epoch in the measurements time span, based on the comparison with the carrier phase ones, in order to minimise the impact of the receiver noise and multipath. An estimation of the variance of the residual error will be also provided, for its use later on to weight the measurements in the in user position and protection level computation.

The fundamentals of the pseudorange smoothing are quite simple. For each epoch, the difference between the iono-free pseudorange and carrier phase measurements is a noisy estimation of the ambiguity (a non-integer value is searched for, since the residual errors and the possible biases between both type of measurements do not allow a precise ambiguity resolution). Unless there is a cycle slip in the carrier phase, what is checked above, the ambiguity obtained at each epoch should be the same except for the noise. Thus averaging the snapshot estimated ambiguities for a time interval will decrease the residual error. Note also that the Hatch filter could be used as an alternative to this moving average scheme.

Some additional considerations have to be made prior to obtain the full picture in an enhanced algorithm. This RAIM algorithm for non-controlled environments is intended for both pedestrian and vehicle users that normally move, but also in static conditions. High-level multipath will be experienced in these conditions, although the values will evolve rapidly for a dynamic user, as long as the relative position of the user, the satellite and the reflectors changes. However, for a static user, the multipath will evolve quite slowly because the reflectors are assumed to be very close to the user (between few metres and several tens), and thus it will be perceived approximately as a bias for several hundreds of seconds. Consequently a specific mechanism has been defined to minimise the pseudorange noise in the static case using the information of the user velocity.

The main steps of the algorithm are the following:

1. For each active satellite "i", compute the snapshot carrier phase non-integer ambiguity, comparing the iono-free pseudorange and carrier phase measurements for the current epoch:

$$N_i(t_k) = \rho_{i,iono\text{-}free}(t_k) - \Phi_{i,iono\text{-}free}(t_k)|$$

2. If there has been a cycle slip, reset the filter.

3. Update the buffer of ambiguities by removing the oldest one (if the buffer is full) and adding the previously computed ambiguity. If the number of ambiguities is above a certain minimum number, compute the averages ( ) for the short-term and long-term filters ($N_{i,average,short}(t_k)$ and $N_{i,average,long}(t_k)$ respectively) together with the associated residual covariance ($S^2_{i,short}(t_k)$ and $S^2_{i,long}(t_k)$ respectively):

$$N_{i,average,short}(t_k) = \frac{1}{M_1} \sum_{l=0}^{M_1-1} N_i(t_{k-l})$$

$$S^2_{i,short}(t_k) = \frac{1}{M_1 - 1} \sum_{l=0}^{M_1-1} (N_i(t_{k-l}) - N_{i,average,short}(t_k))$$

$$N_{i,average,long}(t_k) = \frac{1}{M_2} \sum_{l=0}^{M_2-1} N_i(t_{k-l})$$

$$S^2_{i,long}(t_k) = \frac{1}{M_2 - 1} \sum_{l=0}^{M_2-1} (N_i(t_{k-l}) - N_{i,average,long}(t_k))$$

Note that $M_1$ and $M_2$ will be in the order of 100 and 600 seconds respectively.

4. For each filter and for each snapshot ambiguity, if the difference between it and the average is greater than three times the corresponding standard deviation, then reject the snapshot ambiguity and compute again the averages and the covariance. Repeat this process until no rejection is performed.

5. If the user velocity is above a certain minimum value and the time passed since this condition is met is greater than $M_2$, then the smoothed pseudorange ($\tilde{\rho}_{i,iono\text{-}free}(t_k)$) and the associated residual noise ($\sigma^2_{i,noise}(t_k)$)| is the following:

$$\tilde{\rho}_{i,iono-free}(t_k) = N_{i,average,long}(t_k) + \Phi_{i,iono-free}(t_k)$$

$$\sigma^2_{i,noise}(t_k) = \frac{1}{M_2} \cdot \left( S_{i,noise}(t_k) \cdot \frac{t_{P-1,md}}{K_{N,md}} \right)^2$$

where:

$t_{n-1,md}|$ is the point of the t-Student distribution with "P−1" degrees of freedom that leaves in the tails (two-tail problem) a probability equal to the missed detection probability assigned to the whole RAIM algorithm. The number of independent samples could be computed by means of computing the autocorrelation function of the residuals with respect to the averaged ambiguity;

$K_{N,md}$ is the point of the Gaussian distribution (zero mean and variance equal to 1) that leaves in the tails (two-tail) problem a probability equal to the missed detection probability assigned to the whole RAIM algorithm;

6. If the user velocity is below a certain minimum, then the output of the short-term filter should be used to build the smoothed pseudorange correcting it with the difference between the output of both filters when the velocity was equal to the minimum. In the transition time between both situations, a smoothed variation scheme will take place.

Measurement classification. The measurements classification, to determine the usability for navigation and integrity comprises the following steps: 1. Ranking ordering of the preprocessed measurements according to their characterisation, from better to worst. 2. Rejection of those measurements labeled for rejection during the previous preprocessing. This step should be by-passed in case of lack of enough measurements for computing the navigation solution. There must be available at least the same number of pseudorange measurements than the state vector dimension. 3. Measurements selection: In this stage not all the non rejected measurements have to be used for navigation and integrity. As the characterisation of the measurements could have not been perfect, in particular in the case of the worst measurements with larger errors, is better to use the minimum set of the best measurements being enough for the expected performances.

Navigation and Integrity Computation

Pseudoranges weight update [invention]. The variance of the noise of each pseudorange i will be computed according to the equation in MOPS specification [RD.1], updating the multipath term with the characterisation from the Pseudorange smoothing and error variance estimation step above.

$$\sigma^2_i = \sigma^2_{i,flt} + \sigma^2_{i,UIRE} + \sigma^2_{i,air} + \sigma^2_{i,tropo}$$

$$\sigma^2_{i,air} = \sigma^2_{i,noise} + \sigma^2_{i,multipath} + \sigma^2_{i,divg}$$

And the weight matrix, W, is built as:

$$W^{-1} = \begin{vmatrix} \sigma_1^2 & 0 & \cdots & 0 \\ 0 & \sigma_2^2 & \cdots & 0 \\ \vdots & \vdots & \ddots & \vdots \\ 0 & 0 & \cdots & \sigma_N^2 \end{vmatrix}$$

KDOP test. The objective of this test is to determine for which measurements an error in the pseudorange characterisation can have a negative effect in the positioning error, in order to exclude them from the final set of measurements to be used for navigation and integrity. KDOP definition is found in [RD.4]. The test computes a weighted DOP, comparing the pseudoranges weights in an "a priori" pseudorange noise model with the updated pseudoranges weight.

$$H'^* = (H^T W' H) H^T W'$$

$$D = H'^* W^{-1} H'^{*T}$$

$$KDOP = \sqrt{\text{trace}(D)}$$

Where:
W' "a priori" weight matrix
W Updated current weight matrix
KDOP is computed for the set of N measurements and for all the N−1 subsets: Those measurements that make the N set to have worst KDOP than the N−1 subset excluding that measurement will be rejected for further processing.

The test will be repeated until that the test is passed or until that there is at least one redundant measurement to allow to apply RAIM.

The case considering W'=I is described in the literature ([RD.5]), where the D matrix used for KDOP yields to:

$D=(H^T H)^{-1} H^T W^{-1} H (H^T H)^{-1}$ |while here we are considering an enhanced non simplified expression in order take into account in W the reliable available SBAS information.

SBAS weighted navigation and Protection level computation based on weighted RAIM for multiple failure case [invention]. The navigation and integrity will use only those smoothed pseudoranges corresponding to satellites that have not been rejected in any of the previous tests. The MOPS specification scheme for PA with a RAIM algorithm in parallel ([RD.1], section 2.1.5 "Requirements for APV-II and GLS Precision Approach Operations"), will be used for positioning and integrity with the following modifications: Use of the updated pseudorange weight, instead of the "a priori" MOPS model (There must be at least 1 redundant measurement over the state vector dimension, in order to check the positioning solution with the RAIM FD test). The PL's will be computed either for the case of single failure or for the multiple failure case, depending on the final application. The case of computation of Protection Levels in case of double failure is described in [RD.6]. We have available the demonstration for the generalized problem with multiple failure.

The classical expression of the Protection Levels is obtained maximizing the error in the elements of the state vector due to the failure in one measurement that yields to an increment in the Chi-squared test statistic on the measurements residuals to detect failures. This demonstration has to be enhanced to consider a multiple failure. This is made introducing additional constraints in the problem to be maximized.

One constraint consisting in that the multiple failure yields to a constant value of the chi squared test.

A second constraint consists in defining the failure mode. From all the possible combinations of satellites, only the combinations of any given number M of satellites is allowed.

These two additional constraints introduce a generalized optimisation problem with constraints to be managed with Lagrange mathematical techniques.

The final results of the GARAI algorithm for the end user will be:

Positioning solution,
Associated RAIM PL values,
Integrity flag corresponding to the RAIM FD test for the set of measurements used in positioning, and
Velocity vector, resultant of the RAIM applied to the Carrier Phase measurements.

Depending of the intended final service, and considering the velocity vector, the PL can be expressed as:
One global horizontal PL,
Cross track PL, based in the velocity vector or in the known road lane vector.
Comparison of the PL with any rectangular limit area:

The foregoing descriptions of specific embodiments of the present invention have been presented for purposes of illustration and description. They are not intended to be exhaustive of to limit the invention to the precise forms disclosed, and obviously many modifications and variations are possible in light of the above teaching. The embodiments were chosen as described in order best to explain the principles of the invention and its practical application, thereby to enable others skilled in the art best to utilize the invention and various embodiments with various modification as are suited to the particular use contemplated. It is intended that the scope of the invention be defined by the Claims appended hereto and their equivalents. All variations and modifications which are obvious to those skilled in the art to which the present inven-

We claim:

1. A method for providing a Global Navigation Satellite System (GNSS) navigation position solution with guaranteed integrity in non-controlled environments, the method comprises the steps of:
   A) processing a Global Navigation Satellite System (GNSS) signal including a plurality of satellites generating at least one signal to obtain carrier phase and pseudorange measurements;
   B) pre-processing said measurements to detect and characterize local errors in said measurements, wherein said local errors cannot be ascertained a priori, said characterization including providing error bounds estimated by measuring said carrier phase and pseudoranges measurements, thereby providing a set of measurements rejections when said characterization is not possible;
   C) using said estimated error bounds, together with error bounds provided by the GNSS signal itself concerning satellite and ionospheric errors, to build in each measurement an estimated noise level in said measurements as input to a weighted Receiver Autonomous Integrity Monitoring (RAIM) algorithm in order to compute position coordinates and associated protection levels in the non-controlled environments,
   wherein said step of pre-processing said measurements further includes using traditional carrier phase step detectors and cycle slip detectors together with a carrier phase RAIM algorithm, for the detection and rejection of reflected signal errors,
   wherein said carrier phase RAIM algorithm excludes multipath reflected measurements based on inconsistencies between observed Doppler effect and velocity vectors, in order to ensure detection and exclusion of multipath reflected measurements and to compute velocity and associated protection levels,
   wherein ionospheric errors are compensated based on at least two frequency measurements,
   wherein smoothed pseudoranges are computed using a real-time filter, and
   wherein it uses an algorithm that, based on the time correlation of the multipath errors, characterizes local pseudorange errors—multipath and receiver noise—in terms of associated variance, wherein measurements with excessive multipath errors are excluded for later computations and multipath is mitigated in valid measurements, said algorithm comprises the following steps:
   computing snapshot carrier phase non-integer ambiguity $N_i(t_k)$ for each of said satellites, comparing iono-free pseudorange $\rho_{i,iono\text{-}free}(t_k)$ and carrier phase measurements $\Phi_{i,iono\text{-}free}(t_k)$ for the current epoch: $N_i(t_k) = \rho_{i,iono\text{-}free}(t_k) - \Phi_{i,iono\text{-}free}(t_k)$;
   resetting a cycle slip detector filter when there is a cycle slip;
   updating a buffer of ambiguities by removing the oldest one if the buffer is full, and adding the previously computed ambiguity, and if the number of ambiguities is above a certain minimum number ($N_{min}$), computing the average for short-term and long-term filters, $N_{i,average,short}(t_k)$ and $N_{i,average,long}(t_k)$ respectively, together with the associated residual covariance, $S^2_{i,short}(t_k)$ and $S^2_{i,long}(t_k)$, as follows:

$$N_{i,average,short}(t_k) = \frac{1}{M_1} \sum_{l=0}^{M_1-1} N_i(t_{k-l})$$

$$S^2_{i,short}(t_k) = \frac{1}{M_1-1} \sum_{l=0}^{M_1-1} (N_i(t_{k-l}) - N_{i,average,short}(t_k))$$

$$N_{i,average,long}(t_k) = \frac{1}{M_2} \sum_{l=0}^{M_2-1} N_i(t_{k-l})$$

$$S^2_{i,long}(t_k) = \frac{1}{M_2-1} \sum_{l=0}^{M_2-1} (N_i(t_{k-l}) - N_{i,average,long}(t_k))$$

with $M_1$ and $M_2$ being in the order of 100 and 600 seconds, respectively;
for each filter and for each snapshot ambiguity, if the difference between said snapshot ambiguity and the average is greater than three times the corresponding standard deviation, then the snapshot ambiguity is rejected and averages and covariance are computed again;
if the user velocity becomes greater than a certain minimum value ($V_{user,min}$) for at least a certain minimum time greater than $M_2$, then the smoothed pseudorange $\tilde{\rho}_{i,iono\text{-}free}(t_k)$ and the associated residual noise $\sigma^2_{i,noise}(t_k)$ are as follows:

$$\tilde{\rho}_{i,iono\text{-}free}(t_k) = N_{i,average,long}(t_k) + \Phi_{i,iono\text{-}free}(t_k)$$

$$\sigma^2_{i,noise}(t_k) = \frac{1}{M_2} \cdot \left( S_{i,noise}(t_k) \cdot \frac{t_{P-1,md}}{K_{N,md}} \right)^2$$

where:
$t_{P-1,md}$ is the point of a t-Student distribution with P−1 degrees of freedom that leaves in the tails a probability equal to the missed detection (md) probability assigned to the whole RAIM algorithm; the number of independent samples being calculated by means of computing the autocorrelation function of residuals with respect to averaged ambiguity;
$K_{N,md}$ is the point of a Gaussian distribution with zero mean and variance equal to 1 that leaves in the tails a probability equal to the missed detection probability assigned to the whole RAIM algorithm;
if the user velocity becomes lower than a certain minimum value, then the output of the short-term filter is used to build a smoothed pseudorange correcting it with the difference between the output of both filters when the velocity is equal tot the minimum; and in the transition time between both situations, a smoothed variation scheme is used.

2. The method set forth in claim 1, wherein said step of pre-processing said measurements comprises using improved pseudoranges smoothing technologies and error variance estimation, for the detection and characterization of multipath errors.

3. The method set forth in claim 2, wherein said weighted RAIM algorithm computes the associated protection levels based on real-time pseudoranges weight updates taking into consideration said characterization of measurements.

4. The method set forth in claim 3, wherein said weighted RAIM algorithm computes the associated protection levels considering the possibility of multiple failed measurements.

* * * * *